(No Model.)
E. G. HURT & E. M. HOSTETTER.
MEANS FOR CLOSING PUNCTURES IN PNEUMATIC TIRES.
No. 569,757. Patented Oct. 20, 1896.
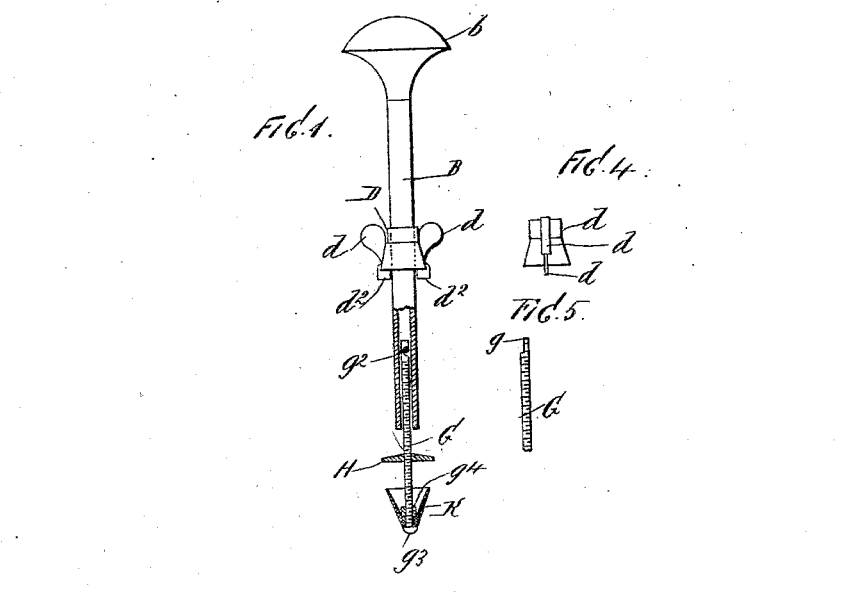
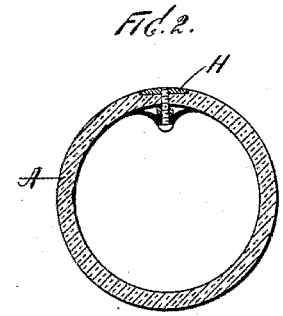
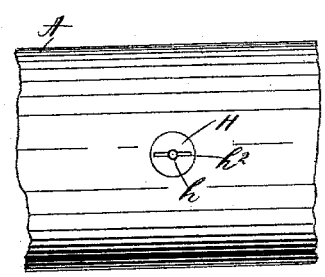
WITNESS:
INVENTORS:
Edwin G. Hurt and
Enoch M. Hostetter,
BY
Edgar Tate & Co.
ATTORNEYS.

UNITED STATES PATENT OFFICE.

EDWIN GARLAND HURT AND ENOCH MELVIN HOSTETTER, OF CALDWELL, IDAHO.

MEANS FOR CLOSING PUNCTURES IN PNEUMATIC TIRES.

SPECIFICATION forming part of Letters Patent No. 569,757, dated October 20, 1896.

Application filed May 5, 1896. Serial No. 590,304. (No model.)

*To all whom it may concern:*

Be it known that we, EDWIN GARLAND HURT and ENOCH MELVIN HOSTETTER, citizens of the United States, and residents of Caldwell, in the county of Canyon and State of Idaho, have invented certain new and useful Improvements in Means for Sealing or Closing Punctures or Holes in Pneumatic Tires, of which the following is a specification, reference being had to the accompanying drawings, forming a part thereof, in which similar letters of reference indicate corresponding parts.

This invention relates to means for plugging or sealing the punctures or holes in the pneumatic tires of bicycles and other vehicles, and the object thereof is to provide an effective device of this class which is simple in construction and operation and by means of which a puncture or hole in a pneumatic tire may be closed in such manner as to render the tire as good as new.

The invention is fully disclosed in the following specification, of which the accompanying drawings form a part, in which—

Figure 1 is a sectional side view of the device which we employ for closing or sealing punctures or holes in a pneumatic tire; Fig. 2, a transverse section of a tire which has been so treated; Fig. 3, a plan view thereof, and Figs. 4 and 5 represent details of the construction.

In the drawings forming part of this specification, A represents an ordinary pneumatic tire such as is employed in connection with bicycles and similar vehicles, and in the practice of our invention we provide a device for plugging or sealing punctures or holes formed therein, which comprises a tubular shaft B, having a knob or handle $b$ at one end and being provided with a sliding sleeve or head D, having projections $d$ at its opposite sides and flanges $d^2$ on the outer end thereof, which project in line therewith, and which abut against the side of the shaft B. We also provide a small screw-threaded rod G, one end of which is flattened and provided with a hook $g$, which is adapted to engage with a transverse pin or plug $g^2$, which is passed through the tubular shaft B at a predetermined distance from the lower open end thereof, and said rod G is provided at its outer end with a head $g^3$, and mounted thereon is an adjustable collar $g^4$. We also employ a small disk H, which is provided with a central screw-threaded passage $h$, with a transverse slot or groove $h^2$ in the top thereof, as shown in Fig. 3, and said top or outer surface is slightly convex. We also employ a hollow conical device K, through the apex of which the rod G is passed, and the said convex surface is directed outwardly and is adapted to rest against the head $g^3$ of the rod G.

The hollow conical attachment K is composed of soft rubber or similar material, and when it is desired to close or seal the puncture or hole in the tire this attachment is mounted on the rod G, as shown in Fig. 1, and the collar $g^4$ is then screwed downwardly thereinto, as is also shown in said figure, after which the conical attachment is filled with soft plastic cement and the disk H is screwed onto said rod into the position shown in Fig. 1. The end of the rod G and the attachment K are then forced through the puncture or opening and the rod G drawn outwardly, and the disk H is screwed down onto said rod until it is embedded in the outer surface of the tire, as shown in Fig. 2. In this operation the sleeve D is run down onto the rod G, and the flanges $d^2$ enter the transverse slot or groove $h^2$ in said disk, and said sleeve serves as a wrench for screwing down the disk H, as will be readily understood. In this operation the attachment K is compressed, as shown in Fig. 2, and the said puncture or hole is securely closed or sealed, and when the disk H has been screwed downwardly on the rod G as far as possible or into the position shown in Fig. 2 and the rod G is filed off even with the surface of the disk, and because of the fact that the disk is compressed in the tire, said disk cannot work off, and the under surface thereof may also be coated with cement before it is screwed down into the position shown in Fig. 2.

It will be understood that a number of the rods G, provided with the collar $g^4$, a disk H, and also a corresponding number of the conical attachments or devices K are provided, one of each of these parts being employed each time that a puncture or hole is closed, plugged, and sealed.

This device is simple in construction and operation and well adapted to accomplish the result for which it is intended, and when the puncture or hole in a pneumatic tire is thus closed or sealed the tire will be as good as new and the injury will scarcely be discernible.

It is evident that changes in the form, construction, and arrangement of parts of our improvement may be made without departing from the spirit of our invention or sacrificing its advantages, and we reserve the right to make all such alterations therein and modifications thereof as fairly come within the scope of the invention.

Having fully described our invention, we claim as new and desire to secure by Letters Patent—

The herein-described device for closing or sealing a puncture or hole in a pneumatic tire, consisting of a screw-threaded rod, having a head at one end and a collar mounted thereon, a disk provided with a central screw-threaded passage through which said rod is adapted to be passed, and an open, conical, hollow flexible attachment which is adapted to be mounted on said rod, adjacent to said head and to be held in position by said collar, and means for operating said parts, consisting of a tubular shaft having a head or handle at one end and provided near its open end with a transverse pin which is adapted to engage with a hook or projection formed on the end of said screw-threaded rod, and said tubular head being provided with a sleeve which is mounted thereon, and provided with shoulders or projections at opposite sides thereof, and with flanges at its end which are adapted to engage with a transverse slot or groove, in the surface of the disk which is mounted on said screw-threaded rod, substantially as shown and described.

In testimony that we claim the foregoing as our invention we have signed our names, in presence of the subscribing witnesses, this 22d day of April, 1896.

EDWIN GARLAND HURT.
ENOCH MELVIN HOSTETTER.

Witnesses:
  LOT L. FELTHAM,
  KATE E. N. FELTHAM.